(12) United States Patent
Bouillet et al.

(10) Patent No.: US 9,104,506 B2
(45) Date of Patent: Aug. 11, 2015

(54) ASSEMBLY AND DEPLOYMENT OF MULTI-PLATFORM FLOW-BASED APPLICATIONS

(75) Inventors: Eric Bouillet, Hawthorne, NY (US); Mark D. Feblowitz, Cambridge, MA (US); Hanhua Feng, Hawthorne, NY (US); Anand Ranganathan, Hawthorne, NY (US); Anton V. Riabov, Hawthorne, NY (US); Octavian Udrea, Hawthorne, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1125 days.

(21) Appl. No.: 12/626,745

(22) Filed: Nov. 27, 2009

(65) Prior Publication Data

US 2011/0131557 A1 Jun. 2, 2011

(51) Int. Cl.
*G06F 9/445* (2006.01)
*G06F 9/54* (2006.01)

(52) U.S. Cl.
CPC ..................................... *G06F 9/541* (2013.01)

(58) Field of Classification Search
CPC ... G06F 9/44547; G06F 8/61; G06F 11/0751; G06F 8/60; G06F 9/5038; G06F 9/5027
USPC ......... 717/100, 174, 175, 177, 104, 168, 169, 717/171, 176
See application file for complete search history.

(56) References Cited

U.S. PATENT DOCUMENTS

| | | | |
|---|---|---|---|
| 7,797,698 B2 * | 9/2010 | Diament et al. ............... | 717/175 |
| 2005/0222827 A1 * | 10/2005 | Emek et al. ....................... | 703/2 |
| 2006/0288055 A1 * | 12/2006 | Johnson et al. ............... | 707/203 |
| 2008/0120614 A1 * | 5/2008 | Yamada ......................... | 717/175 |
| 2008/0235710 A1 * | 9/2008 | Challenger et al. ........... | 719/316 |
| 2013/0047150 A1 * | 2/2013 | Malasky et al. ............... | 717/176 |

OTHER PUBLICATIONS

Altinel, M.: Damia: A data mashup fabric for intranet applications. In: VLDB. (2007).
Narayanan, S., McIlraith, S.: Simulation, verification and automated composition of web services. In: WWW. (2002).
Traverso, P., Pistore, M.: Automated composition of semantic web services into executable processes. In: ISWC'04.
Wolf et al, J.: SODA: an optimizing scheduler for large-scale stream-based distributed computer systems. In: Middleware. (2008) 306-325.

(Continued)

*Primary Examiner* — Md. I Uddin
(74) *Attorney, Agent, or Firm* — F. Chau & Associates, LLC

(57) ABSTRACT

A method and computer program product for assembling and deploying multi-platform flow based applications. An information processing flow that produces a result is assembled, the information processing flow includes components connected by data links, a component includes software code that describes at least one of an input constraint or an output constraint of the component, and at least two of the components are deployable on different computing platforms. The information processing flow is partitioned into sub-flows, such that for each sub-flow every component in the sub-flow is deployable on the same computing platform. The sub-flows are deployed on their respective computing platforms.

15 Claims, 4 Drawing Sheets

(56) References Cited

OTHER PUBLICATIONS

Riabov, A., Bouillet, E., Feblowitz, M., Liu Z., Ranganathan, A.: Wishful search: Interactive composition of data mashups. In: WWW. (2008).

Bouillet, E., Feblowitz, M. Liu, Z., Ranganathan, A., Riabov, A.: A tag-based approach for the design and composition of information processing applications. In: OOPSLA. (2008) 585-602.

Krishnan, S., Wagstrom, P., Laszewski, G.V.: GSFL: A workflow framework for grid services. Technical report, Argonne National Laboratory, 9700 S. Cass Avenue, Argonne, IL 60439 (2002).

Riabov, A., Liu, Z.: Scalable planning for distributed stream processing systems. In: Intl Conf on Automated Planning and Scheduling. (2006).

Gedik, B., Andrade, H., Wu, K.L., Yu, P.S., Doo, M.: SPADE: the System S declarative stream processing engine. In: SIGMOD 2008. (2008) 1123-1134.

\* cited by examiner

ASSEMBLY AND DEPLOYMENT OF MULTI-PLATFORM FLOW-BASED APPLICATIONS

GOVERNMENT INTERESTS

This invention was made with Government support under Contract No.: H98230-07-C-0383 awarded by the U.S. Department of Defense. The Government has certain rights in this invention.

BACKGROUND

1. Technical Field

The present invention relates to information processing flow assembly and deployment.

2. Discussion of the Related Art

Flow-based applications extract data from one or more sources, process them using one or more components, and finally produce useful results for end-users. One of the challenges in many organizations is that the components may be available on multiple legacy and new platforms that may use different models for information processing and exchange.

BRIEF SUMMARY

In accordance with an exemplary embodiment of the present invention, there is provided a middleware that supports the assembly and deployment of information processing flows that span multiple platforms. The middleware uses a generic application model, where each component is associated with platform-independent assembly and platform-specific deployment information. This enables the assembly of multi-platform flows, while hiding the details of the platforms from the assembly process. During deployment, a multi-platform flow is broken into one or more single-platform sub-flows. The middleware handles the deployment of the sub-flows in each platform as well as the instantiation of bridging components that enable communication across different platforms.

Exemplary embodiments of the present invention provide a method and computer program product for assembling and deploying multi-platform flow-based applications. An information processing flow that produces a result is assembled, the information processing flow includes components connected by data links, a component includes software code that describes at least one of an input constraint or an output constraint of the component, and at least two of the components are deployable on different computing platforms. The information processing flow is partitioned into sub-flows, such that for each sub-flow every component in the sub-flow is deployable on the same computing platform. The sub-flows are deployed on their respective computing platforms.

DETAILED DESCRIPTION

Figure 1:
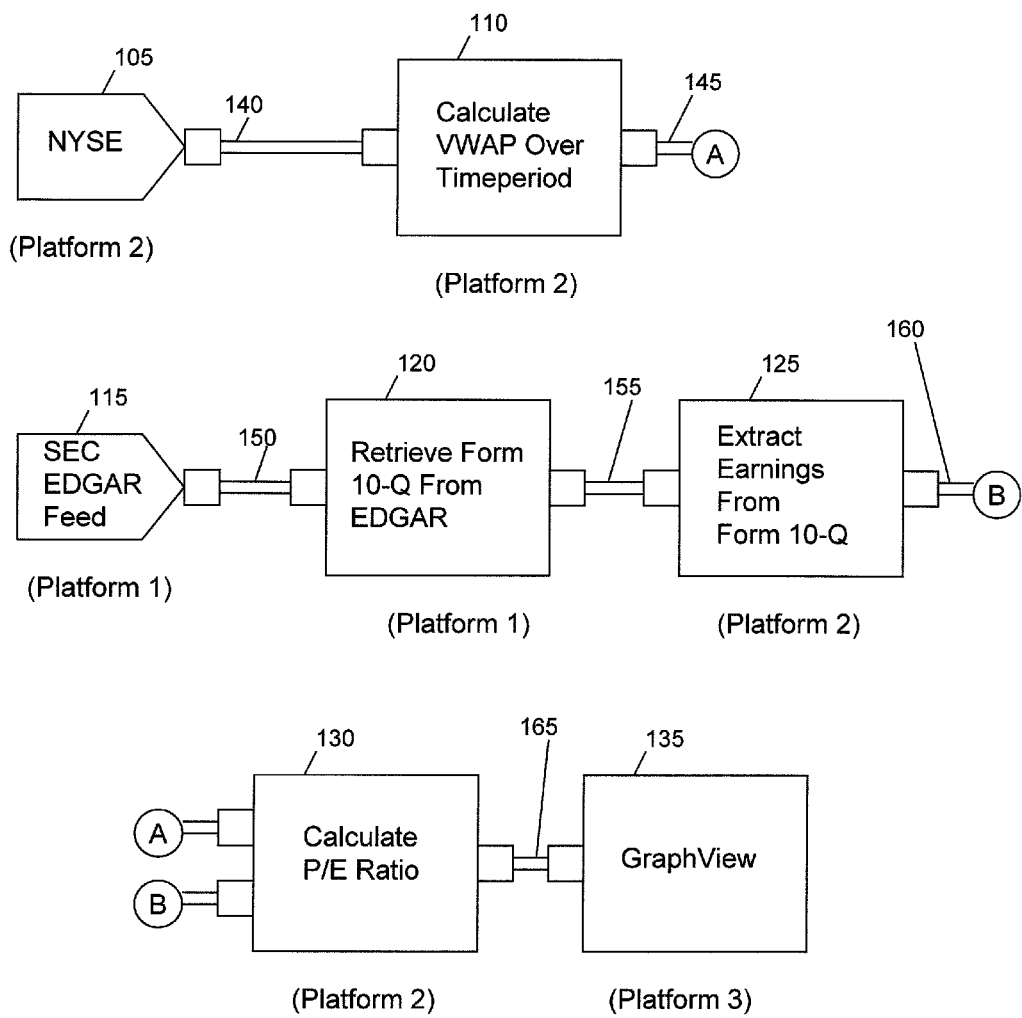
FIG. 1 illustrates an example information processing flow spanning three platforms.

An information processing flow obtains data from different sources, aggregates or integrates them in different manners, applies different kinds of analyses on the data and, visualizes or handles the end-results in different ways, for example. An information processing flow may be viewed as a directed acyclic graph of black-box components, which include data sources and processing components, connected by data flow links. Flows are used to describe information processing applications in different platforms including service oriented systems, event-driven systems, data mashups, stream processing systems, extract-transform-load systems and the grid, for example.

Challenges exist in the assembly and deployment of information processing flows. For example, assembly is complex since there may be a very large number of components available, and users may not be aware of the syntactic and the semantic constraints in assembling different components into complex flows. Deployment is complex since the users may not know how best to distribute and schedule the flow graph on a distributed system.

Assembly and deployment have been dealt with in the case of single-platform flows. However, existing works are not known to handle multi-platform flows. For example, due to the way organizations evolve, there is often a proliferation of legacy and new platforms installed. These platforms may use different models or protocols for information exchange and processing. For example, they may use a push model (e.g., stream or event-processing systems) or a pull model (e.g., request-response based and service oriented systems). Some systems follow a batch processing paradigm (e.g., extract-transform-load and grid systems), while others follow a more real-time processing paradigm (e.g., stream-processing systems). Domain experts and analysts in these organizations often have to use components from different platforms to carry out their information processing tasks. However, they are faced with the task of figuring out how to split their information processing across the different platforms, and then figuring out how to make the different platforms interoperate.

In this disclosure, described are exemplary embodiments of a middleware that facilitates the assembly and deployment of information processing flows that span different platforms. In the middleware, flow assembly is platform-independent, in other words, end-users do not have to worry about the details of the underlying platforms while assembling the flow. Thus, end-users can assemble multi-platform flows if that is what best meets their requirements. The middleware takes care of the details of how to deploy the multi-platform flows.

The middleware uses a common model of components, which includes both assembly and deployment instructions. The assembly instructions are general and platform-independent, while the deployment instructions are platform-specific. For example, the assembly instructions for a component are in the form of semantic, tag-based constraints on the inputs and outputs of the component. This allows flows to be assembled at a high level, using general tag-based constraints.

The deployment instructions for each component describe how to instantiate or invoke the component on a certain platform, how to configure it appropriately, and how to handle the inputs to and outputs from the component. Each component is typically developed for a certain platform, and the deployment instructions are usually in a platform-specific scripting or instruction language (e.g., business process execution language (BPEL)).

The middleware uses an open service gateway initiative (OSGi)-based plugin architecture. There are various assembly plugins that provide different means of assembling flows from individual components, including both planning-based automated assembly and manual assembly. For deployment, there is a plugin that is responsible for breaking up an assembled flow into a number of sub-flows that can be deployed on different platforms. In addition, there are separate plugins for managing deployments on each platform. Further, there are plugins for bridging across selected pairs of platforms.

Hereinafter, information processing components and flows, the common model of components, and the architecture and flow lifecycle of the middleware will be described in further detail.

Components can have zero or more input ports and zero or more output ports. In addition, components can be instantiated or configured with parameter values that influence the way they behave. In an exemplary embodiment of the present invention, a component may be treated as a black-box, where the only things known about the component are its inputs, outputs and parameters. Each component can be deployed on a specific platform.

A flow is a directed acyclic graph of components, where the vertices are components and the edges are data links between input and output ports of components. An example flow requirement is that all directed edges (data links from source output ports to target input ports) are valid. For example, the data produced at the source output port is semantically and syntactically compatible with the data required at the target input port. There are different languages for describing flows on different platforms, e.g., BPEL in service-oriented systems, grid services flow language (GSFL) in the Grid, etc.

In different platforms, data links may be implemented in different manners. For example, in web-based mashup systems like Yahoo Pipes, the data links are really simple syndication (RSS) feeds. In stream processing and event-driven systems, the data links are data or event streams. In extract-transform-load systems, the links are tables. In service-based systems, the links may be extensible markup language (XML) messages.

FIG. 1 shows an example information processing flow that spans three platforms (platforms 1-3) and includes several components (105-135) connected by data links (140-165). The flow calculates the real-time P/E (Price-Earnings) ratio for a company. The flow gets real-time prices from the New York Stock Exchange, and calculates a volume weighted average price (or VWAP) for a company. The flow gets company earnings from an EDGAR feed by retrieving and parsing a certain form 10-Q. Finally, the flow displays the P/E ratio on a graph.

The platforms used in this example may be IBM DAMIA, IBM InfoSphere Streams and Project Zero. A platform may be a computing platform that includes a software architecture or software framework that allows software to run, for example. IBM DAMIA provides tools for assembling data feeds from the Internet and enterprise data sources, and then aggregates and transforms data from these feeds, for example. IBM InfoSphere Streams provides an execution platform and services for user-developed applications that ingest, filter, analyze, and correlate potentially massive volumes of continuous data streams, for example. Project Zero provide tools to create, assemble and execute web 2.0 applications based on service-oriented architecture, for example.

Components in IBM DAMIA and Project Zero follow a request-response model, for example. For example, flows in these platforms are driven by an orchestrator that invokes different components in a certain order. Components in IBM Info Sphere Streams follow an event-driven model, where data is pushed to each component on one or more input ports, and the component in turn pushes data out on one or more input ports, for example.

There are several reasons why one may want to assemble and deploy a cross-platform flow. Each platform is well suited for performing certain kinds of computations. For example, IBM InfoSphere Streams is well suited for processing large volumes of streaming data with low latency, IBM DAMIA is well suited for accessing data from different kinds of structured and unstructured sources, and Project Zero is well-suited for deploying different kinds of web-based visualizations. In addition, each platform may have a large library of components that one may wish to use in a flow.

The common component model includes both assembly and deployment instructions. Assembly instructions can be used by manual or automated composition approaches to help decide which components can be interconnected in a flow. The deployment instructions are platform-specific and are used to create a flow description that can be understood by the platform.

Assembly is facilitated through tag-based models of the components' functional capabilities (e.g., of the inputs and outputs of the components). In this approach, data links in the flows are described by a set of tags (or keywords), and component inputs and outputs are also described using a set of tags. In the case of automated assembly, end-user goals are also described by sets of tags.

The model uses tags to describe input message requirements, the configuration parameters and the output messages of components. The tags are drawn from a tag-hierarchy, which defines sub-tag relationships (e.g., IBM is a sub-tag of Company). It also allows the use of variables to describe how the semantic properties of the data are propagated from the input message and configuration parameters to the output message.

Figure 2:
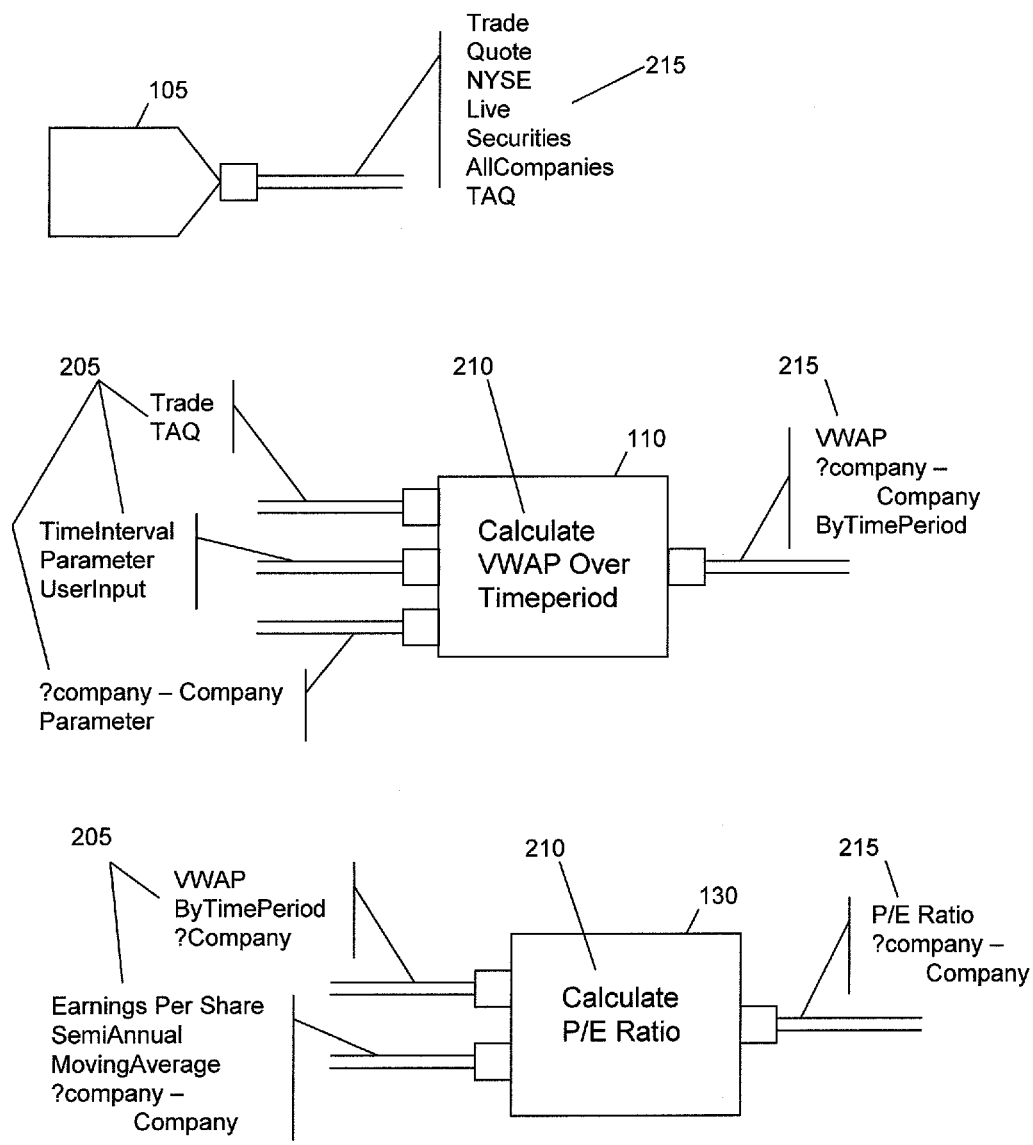
FIG. 2 illustrates example components with tags describing their input ports, configuration parameters and output ports.

FIG. 2 shows some examples of component descriptions. For example, FIG. 2 shows inputs tags 205 of components 110 and 130, configuration parameters 210 of the components 110 and 130 and output tags 215 of the components 110 and 130. Consider the Calculate VWAP over TimePeriod component which calculates a VWAP of a stock. It has an input, which is a trade feed, in a TAQ (Trade-And-Quote) format. It has two configuration parameters, that is to say, the time period over which the average must be calculated, and the company name. The values of these configuration parameters may be obtained from an end user. This component description includes a variable ?company, of type Company. ?company can be bound by any sub-tag of Company in the tag hierarchy (such as IBM, Google, etc.), and this same binding gets propagated to the output description.

The tag-based model allows determining whether a data link, produced by some sub-flow, or a parameter value, can be given as input to another component. A data link, a, can be described by a set of tags, d(a). An input message constraint, I is defined as a set of tags and variables. A set of tags, d(a) may be defined to match an input constraint, I (denoted by d(a) p I), iff 1. For each tag in I, there exists a sub-tag that appears in d(a).
2. For each variable in I, there exists a tag in d(a) to which the variable can be bound. Variables can be bound to any sub-tag of their types.

The same approach is also used to match a parameter value (associated with a set of tags) to a parameter constraint of a component. After a match is found for each input and parameter of a component, the tag-description of the output message of the component is then formed by replacing all the variables in the output description by the tags to which they were bound in the input side.

The tag-based model allows a decision to be made as to whether a data link, produced by some sub-flow, or a parameter value, can be given as input to another component. This can be used to aid both automated and manual composition. The middleware includes an automated, artificial intelligence (AI) planner-based, flow assembly service. The planner takes an end-user goal described by a set of tags and constructs a flow that produces a data link that satisfies the goal tags. The planner is based on the stream processing planning language (SPPL) formalism. For example, given a goal P/E Ratio, IBM, the planner may automatically construct the flow in FIG. 1.

Each component is associated with deployment instructions, which are in the form of code fragments in a platform-specific language. For example, IBM InfoSphere Streams uses a language called SPADE (stream processing application declarative engine) to describe stream processing operators and how they are connected together in a flow. Hence, each IBM InfoSphere Streams component is associated with a fragment of the SPADE language, describing the invocation of an operator with certain input streams and certain parameters to produce output streams. In the case of web service workflows, each component is associated with a BPEL fragment, describing the invocation of a service with a certain input message to produce an output message.

In the middleware, all component descriptions, including both assembly and deployment aspects, are represented in an XML format. Table 1 provides an example component description for the P_by_E ratio component. More specifically, Table 1 is an IBM InfoSphere Streams component description that shows tagged input and output ports, and accompanying variable definitions. It also shows a SPADE code fragment, describing a Join operator that joins price and earnings data, and calculates the P/E ratio. The input and output ports have the same names in the assembly and deployment sections.

Figure 3:
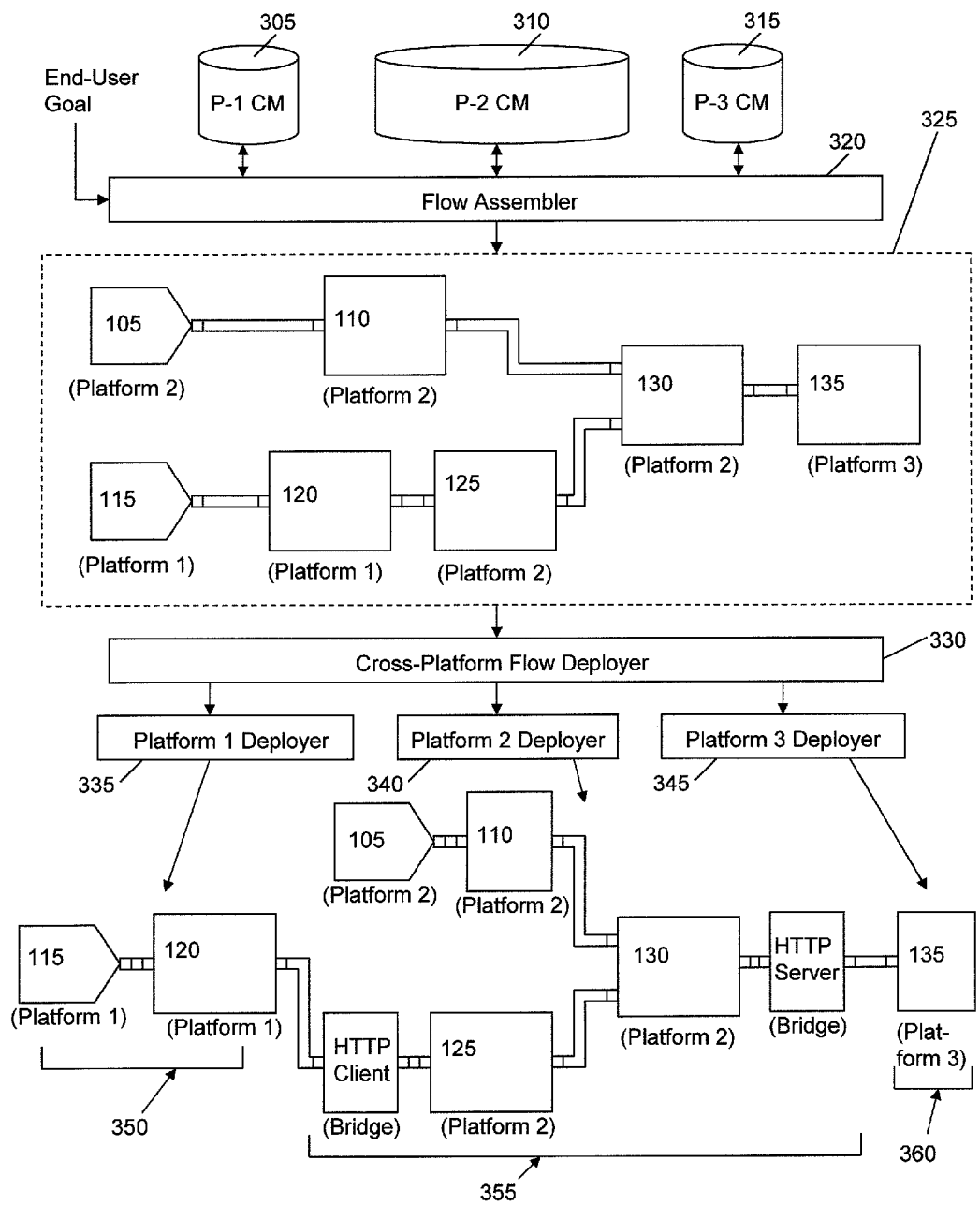
FIG. 3 illustrates elements of a middleware architecture in accordance with an exemplary embodiment of the present invention.

FIG. 3 illustrates elements of the middleware architecture. A flow assembler (320) creates flows using component models (305, 310 and 315) that have been developed on different platforms (e.g., platforms 1-3), and a cross-platform flow deployer (330) deploys the assembled flows across the different platforms. The platforms illustrated in FIG. 3 may be IBM DAMIA, IBM InfoSphere Streams and Project Zero. Four steps in the flow lifecycle: assembly, partitioning, platform-specific deployment and insertion of bridging components, can be gleaned from FIG. 3.

The middleware flow assembler can use manual or automated approaches to assemble multi-platform flows. The automated approach uses an AI planner to assemble flows in an automated manner given high-level end-user goals. In the manual approach, users can assemble flows in a drag-and-drop editor using the tags to search for compatible components.

The middleware cross-platform flow deployer partitions the complete assembled multi-platform flow (325) into platform-specific sub-flows (350-360). For example, IBM InfoSphere Stream components (platform 2) will form one sub-flow (355) and a Project Zero component (platform 3) will form another subflow (360). However, if the topology of the complete assembled flow is such that there are two independent IBM InfoSphere Streams sub-flows connected to one Project Zero sub-flow, then two IBM InfoSphere Streams sub-flows will be generated—hence the number of generated sub-flows depends not only on the set of platforms used by the flow but also on the topology of the flow.

The cross-platform flow deployer, then, deploys each sub-flow via different platform-specific deployers. Each platform-specific deployer provides an interface to translate a sub-flow into a platform-specific flow-script, making use of the code fragments in the deployment section of the component description. Typically, the deployer concatenates all the individual code fragments in a certain order to produce a complete flow description (in SPADE or BPEL). In addition, it generates new names for all data links in the sub-flow (so that they do not conflict with links on any other flows), and

TABLE 1

```
<?xml version="1.0" encoding="UTF-8"?>
<component name="P_by_E_ratio">
<title>Calculate P/E ratio from real-time price and last earnings</title>
<!--Assembly Instructions-->
<var name="?company" type= "Company"/>
<var name="?stockExchange" type="StockExchange"/>
<input name="PriceInputFromExchange" tags="ByTimePeriod ?company ?stockExchange VWAP"/>
<input name="EarningsInput" tags="EarningsPerShare SemiAnnual MovingAverage ?company"/>
<output name="P_by_E_Output" tags="P/E Ratio ?company ?stockExchange"/>
<!--Deployment Instructions in the SPADE language for IBM InfoSphere Streams -->
<binding type="infosphere_stream">
<!--  BEGIN DEFINITION IN SPADE -->
stream @P_by_E_Output @ (P_E_ratio : Float)
   := Join(@PriceInputFromExchange@ <count(1)>;
       @EarningsInput@ <count(0)>) [true]
    {@PriceInputFromExchange@.price / @EarningsInput@.earnings}
</binding></component>
```

The middleware is unaware of any platform-specific flow languages, and does not attempt to parse the code fragment corresponding to the deployment instructions. However, it needs to know certain key strings in the code fragment such as any references to input and output ports, and parameters, so that it can replace these references with parameter strings or newly generated input and output data link names in a composed flow. Hence, in the middleware deployment description, any names of input or output links must be enclosed within @s.

also fills in component parameter values based on user-input. Each deployer also provides interfaces to manage the sub-flow lifecycles, including starting or terminating a sub-flow, and retrieving the run-time status of a sub-flow. The deployers can also make use of any deployment features present in the individual platforms. For example, IBM InfoSphere Streams includes a scheduler that optimizes placement of components on a distributed set of machines to minimize latency.

Each platform-specific deployer deploys a sub-flow, and returns an output description to the cross-platform flow deployer. This output description contains a reference to where the output of the sub-flow can be obtained.

The deployment of the sub-flows for individual platforms is carried out in flow order, which is possible since the middleware supports direct acyclic flows. Hence, for every directed communication link between platforms, the sending sub-flow is deployed before the receiving sub-flow. This allows the cross-platform deployer to pass dynamically generated output references from one platform to another. For example, deploying an RSS processing flow in DAMIA results in a dynamically generated feed uniform resource locator (URL) that can then be passed to the sub-flow in another platform that will retrieve the feed.

Each unique (ordered) pair of platforms is associated with a specific bridging strategy that is configured by a bridging plugin. This bridging strategy involves the instantiation of additional components in the sending sub-flow and/or the receiving sub-flow. These components may implement buffering strategies (e.g., when bridging from a streaming platform to a request-response platform) or polling strategies (when bridging the other way).

For example, the bridging component between DAMIA and IBM InfoSphere Streams is a hypertext transfer protocol (HTTP) client deployed on IBM InfoSphere Streams that continuously retrieves data from the URL exposed by DAMIA and converts the data into stream data objects that can be consumed by IBM InfoSphere Stream components. The specific parameters of the bridging component (such as the frequency of polling the DAMIA URL) can be tuned for each specific application.

Once a sub-flow is deployed, it becomes a job on its individual platform and a unique identifier of the job is returned to the cross-platform deployer. Using this unique identifier, a job can be stopped, or its status can be checked, by calling a method on the platform specific plugin service. The cross-platform deployer of the middleware supports the lifecycle of the composite job, formed of jobs deployed to individual platforms. In particular, stopping the composite job results in the stop method being called for the individual jobs.

The middleware is involved only in the set up of the flow and not in the actual data transmission. It does not transmit data between platforms, and instead ensures that the components on the platforms are configured to do so.

Figure 4:
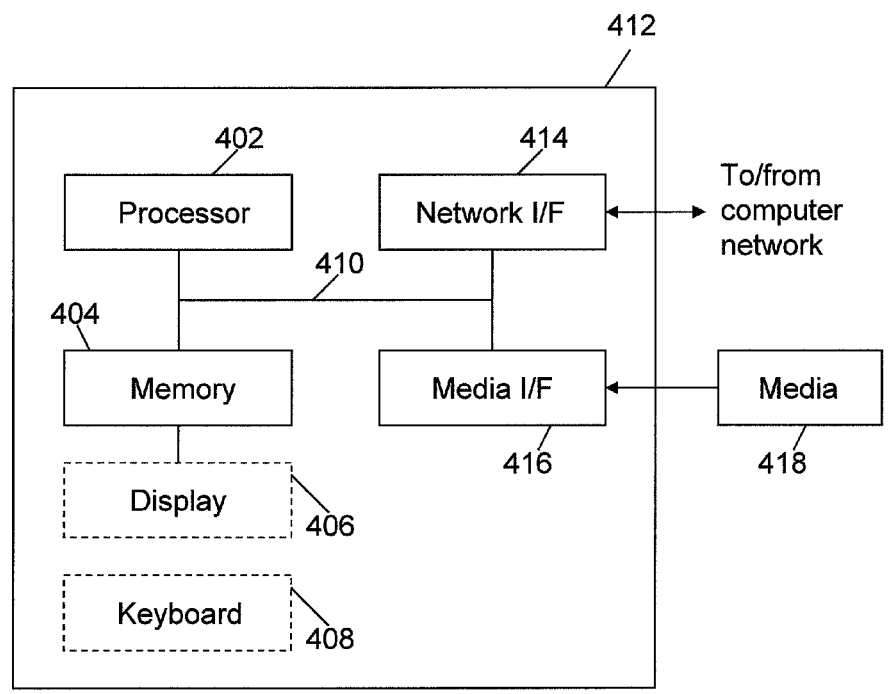
FIG. 4 illustrates a computer system in which exemplary embodiments of the present invention may be implemented.

An implementation of an exemplary embodiment of the present invention may make use of software running on a general-purpose computer or workstation. With reference to FIG. 4, such an implementation might employ, for example, a processor 402, a memory 404, and an input and/or output interface formed, for example, by a display 406 and a keyboard 408. The term "processor" as used herein is intended to include any processing device, such as, for example, one that includes a central processing unit (CPU) and/or other forms of processing circuitry. Further, the term "processor" may refer to more than one individual processor. The term "memory" is intended include memory associated with a processor or CPU, such as, for example, RAM, ROM, a fixed memory device (for example, hard drive), a removable memory device (for example, diskette), a flash memory and the like. In addition, the phrase "input and/or output interface" as used herein, is intended to include, for example, one or more mechanisms for inputting data to the processing unit (for example, mouse), and one or more mechanisms for providing results associated with the processing unit (for example, printer). The processor 402, memory 404, and input and/or output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing exemplary embodiments of the present invention may be stored in one or more of the associated memory devices (for example, read-only memory (ROM), fixed or removable memory) and, when ready to be utilized, loaded in part or in whole (for example, into random access memory (RAM)) and executed by a CPU. Such software could include, but is not limited to, firmware, resident software, microcode, and the like.

As shown in FIG. 4, examples of a computer readable medium having computer readable program code for carrying out aspects of the present invention embodied thereon may include media 418 and memory 404.

A data processing system suitable for storing and/or executing program code may include at least one processor 402 coupled directly or indirectly to memory elements 404 though a system bus 410. The memory elements can include local memory employed during actual execution of the program code, bulk storage, and cache memories which provide temporary storage of at least some program code to reduce the number of times code must be retrieved from bulk storage during execution.

Input and/or output or I/O devices (including but not limited to keyboards 408, displays 406, pointing devices, and the like) can be coupled to the system either directly (such as via bus 410) or through intervening I/O controllers.

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a RAM, a ROM, an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical functions(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    assembling automatically an information processing flow that produces a result, wherein the information processing flow includes components connected by data links, wherein a component includes software code that describes at least one of an input constraint or an output constraint of the component, wherein at least two of the components are deployable on different computing platforms, and wherein the information processing flow is a directed acyclic graph;
    partitioning the information processing flow into sub-flows, wherein for each sub-flow every component in the sub-flow is deployable on the same computing platform; and
    deploying the sub-flows on their respective computing platforms,
    wherein a multi-platform flow is broken into one or more single-computing platform sub-flows and a middleware handles the deployment of the sub-flows on each computing platform as well as instantiation of bridging components that enable communication across different computing platforms, wherein a data link is described by a set of tags d(a), an input constraint I of a component is defined by tags and variables, and the set of tags d(a) is defined to match the input constraint I if 1) for each tag in I, there exists a sub-tag that appears in d(a) and 2) for each variable in I, there exists a tag in d(a) to which the variable can be bound, wherein the variables describe how semantic properties of data are propagated from an input message and how configuration parameters are propagated to an output message, wherein each component of the information processing flow includes deployment instructions, wherein each sub-flow is deployed with a deployer specific to the computing platform of all of the sub-flow's components, and wherein the deployer translates the sub-flow into a flow-script specific to the computing platform of all of the sub-flow's components by using code fragments found in the deployment instructions of the sub-flow's components, wherein the deployers that deploy the sub-flows manage lifecycles of their respective sub-flows, including starting, and terminating the sub-flow, and retrieving a runtime status of the sub-flow, and wherein each platform is associated with a specific bridging strategy configured by a bridging plugin, the bridging strategy involving instantiation of additional components in a sending sub-flow or a receiving sub-flow, the additional components implementing buffering or polling strategies, and middleware is involved only in the setup of the information processing flow and not actual data transmission.

2. The method of claim 1, wherein the deployers that deploy the sub-flows provide output descriptions of their respective deployed sub-flows to a cross-platform flow developer, and wherein the output descriptions contain a reference to where the output of the respective sub-flow can be found to facilitate communication between different computing platforms of the sub-flows.

3. The method of claim 1, wherein the sub-flows are deployed such that the sending sub-flow is deployed before the receiving sub-flow.

4. The method of claim 1, wherein the additional components include bridging components.

5. The method of claim 4, wherein bridging components include a hypertext transfer protocol (HTTP) client and an HTTP server.

6. The method of claim 1, wherein the information processing flow is assembled automatically in response to a goal and the information processing flow satisfies the goal.

7. The method of claim 6, wherein the goal is described by semantic tags.

8. The method of claim 1, wherein the components include a data source, a data processing component, and a data sink.

9. The method of claim 8, wherein the data processing component processes data output from the data source and provides the processed data as the result to the data sink for visualization.

10. A computer program product, comprising:
a computer readable storage medium having computer readable program code embodied therewith, the computer readable program code comprising:
computer readable program code configured to assemble automatically an information processing flow that produces a result, wherein the information processing flow includes components connected by data links, wherein a component includes software code that describes at least one of an input constraint or an output constraint of the component, wherein at least two of the components are deployable on different computing platforms, and wherein the information processing flow is a directed acyclic graph;
computer readable program code configured to partition the information processing flow into sub-flows, wherein for each sub-flow every component in the sub-flow is deployable on the same computing platform; and
computer readable program code configured to deploy the sub-flows on their respective computing platforms, wherein a multi-platform flow is broken into one or more single-computing platform sub-flows and a middleware handles the deployment of the sub-flows on each computing platform as well as instantiation of bridging components that enable communication across different computing platforms, wherein a data link is described by a set of tags d(a), an input constraint I of a component is defined by tags and variables, and the set of tags d(a) is defined to match the input constraint I if 1) for each tag in I, there exists a sub-tag that appears in d(a) and 2) for each variable in I, there exists a tag in d(a) to which the variable can be bound, wherein the variables describe how semantic properties of data are propagated from an input message and how configuration parameters are propagated to an output message, wherein each component of the information processing flow includes deployment instructions, wherein each sub-flow is deployed with a deployer specific to the computing platform of all of the sub-flow's components, and wherein the deployer translates the sub-flow into a flow-script specific to the computing platform of all of the sub-flow's components by using code fragments found in the deployment instructions of the sub-flow's components, wherein the deployers that deploy the sub-flows manage lifecycles of their respective sub-flows, including starting, and terminating the sub-flow, and retrieving a runtime status of the sub-flow, and wherein each platform is associated with a specific bridging strategy configured by a bridging plugin, the bridging strategy involving instantiation of additional components in a sending sub-flow or a receiving sub-flow, the additional components implementing buffering or polling strategies, and middleware is involved only in the setup of the information processing flow and not actual data transmission.

11. A method, comprising:
assembling automatically an information processing flow that includes a plurality of components, wherein an output of each sending component in the flow is connected to an input of a receiving component in the flow through a data link produced by the sending component in response to a determination that assembly instructions of the receiving component permit connection to the data link, and wherein the information processing flow is a directed acyclic graph;
partitioning the information processing flow into sub-flows, wherein the sub-flows operate on different computing platforms from each other and each sub-flow only operates on a single computing platform;

deploying the sub-flows on their respective computing platforms, wherein each component in each sub-flow is deployed in accordance with its deployment instructions; and inserting bridging components in the deployed sub-flows to permit an output of a first deployed sub-flow to be used as an input of a second deployed sub-flow, wherein a multi-platform flow is broken into one or more single-computing platform sub-flows and a middleware handles the deployment of the sub-flows on each computing platform as well as insertion of the bridging components that enable communication across different computing platforms, wherein the assembly instructions of a component include an input constraint I describing requirements of an input of the component, and a data link is described by a set of tags d(a), the input constraint I of the component is defined by tags and variables, and the set of tags d(a) is defined to match the input constraint I if 1) for each tag in I, there exists a sub-tag that appears in d(a) and 2) for each variable in I, there exists a tag in d(a) to which the variable can be bound, wherein the variables describe how semantic properties of data are propagated from an input message and how configuration parameters are propagated to an output message, wherein each component of the information processing flow includes deployment instructions, wherein each sub-flow is deployed with a deployer specific to the computing platform of all of the sub-flow's components, and wherein the deployer translates the sub-flow into a flow-script specific to the computing platform of all of the sub-flow's components by using code fragments found in the deployment instructions of the sub-flow's components, wherein the deployers that deploy the sub-flows manage lifecycles of their respective sub-flows, including starting, and terminating the sub-flow, and retrieving a runtime status of the sub-flow, and wherein each platform is associated with a specific bridging strategy configured by a bridging plugin, the bridging strategy involving instantiation of additional components in a sending sub-flow or a receiving sub-flow, the additional components implementing buffering or polling strategies, and middleware is involved only in the setup of the information processing flow and not actual data transmission.

12. The method of claim 11, wherein the deployment instructions of a component include a description of how to instantiate or invoke the component on a specific computing platform, a description of how to configure or parameterize the component for a given information processing flow, and a description of how to handle an input message to or an output message from the component.

13. The method of claim 12, wherein the deployment instructions include code fragments of a scripting or instruction language for the specific computing platform through which the component is to be instantiated or invoked.

14. The method of claim 11, wherein a computing platform includes a software architecture or software framework that allows software to run.

15. The method of claim 11, wherein the assembly instructions are computing platform independent and the deployment instructions are computing platform specific.

\* \* \* \* \*